US010801593B2

(12) United States Patent
Nielsen et al.

(10) Patent No.: US 10,801,593 B2
(45) Date of Patent: Oct. 13, 2020

(54) STRUT EXTENDER MECHANISM

(71) Applicant: Paratech, Incorporated, Frankfort, IL (US)

(72) Inventors: Kenneth E. Nielsen, Chicago, IL (US); George Roxton, Homer Glen, IL (US); William O. Teach, Frankfort, IL (US)

(73) Assignee: Paratech, Incorporated, Frankfort, IL (US)

( * ) Notice: Subject to any disclaimer, the term of this patent is extended or adjusted under 35 U.S.C. 154(b) by 287 days.

(21) Appl. No.: 15/958,666

(22) Filed: Apr. 20, 2018

(65) Prior Publication Data

US 2018/0313436 A1 Nov. 1, 2018

Related U.S. Application Data

(60) Provisional application No. 62/490,294, filed on Apr. 26, 2017.

(51) Int. Cl.
*F16H 25/20* (2006.01)
*F16H 19/04* (2006.01)
*F16D 41/16* (2006.01)
*E04G 25/06* (2006.01)
*F16H 1/22* (2006.01)

(52) U.S. Cl.
CPC .......... *F16H 25/20* (2013.01); *E04G 25/065* (2013.01); *F16D 41/16* (2013.01); *F16H 19/04* (2013.01); *F16H 1/222* (2013.01); *F16H 2025/2071* (2013.01); *F16H 2025/2084* (2013.01); *F16H 2025/2093* (2013.01)

(58) Field of Classification Search
CPC .......... F16H 25/20; F16H 19/04; F16H 1/222; F16H 2025/2071; F16H 2025/2084; F16H 2025/2093; E04G 25/065; F16D 41/16
USPC .................. 248/354.1, 354.3, 161, 422, 584; 74/89.34
See application file for complete search history.

(56) References Cited

U.S. PATENT DOCUMENTS

| | | |
|---|---|---|
| 5,348,437 A | 9/1994 | Krupke et al. |
| 5,374,156 A | 12/1994 | Simpson et al. |
| 5,433,578 A | 7/1995 | Honan |
| 5,462,257 A | 10/1995 | Trowbridge |
| 5,462,303 A | 10/1995 | Langen et al. |
| 5,499,796 A | 3/1996 | Kigawa et al. |
| 5,575,513 A | 11/1996 | Tuttle |
| 5,582,332 A | 12/1996 | Kiefer et al. |
| 5,584,363 A | 12/1996 | Curtin et al. |
| 5,588,258 A | 12/1996 | Wright et al. |
| 5,590,863 A | 1/1997 | Sasaki |
| 5,655,733 A | 8/1997 | Roach |
| 5,678,264 A | 10/1997 | Walker |
| 5,680,814 A | 10/1997 | Lautzenhiser et al. |
| 5,689,841 A | 11/1997 | Black et al. |
| 5,715,548 A | 2/1998 | Weismiller et al. |
| 5,755,164 A | 5/1998 | Korte et al. |
| 5,794,907 A | 8/1998 | Bellia |
| 5,797,618 A | 8/1998 | Brokholc |
| 5,799,759 A | 9/1998 | Koch |

(Continued)

*Primary Examiner* — Muhammad Ijaz
(74) *Attorney, Agent, or Firm* — Banner & Witcoff, Ltd.

(57) ABSTRACT

An adjustable strut that includes an outer housing configured to receive an extendable member, and an extending mechanism with a gear system configured to convert rotation motion of an input mechanism into linear translation of the extendable member.

17 Claims, 12 Drawing Sheets

(56) References Cited

U.S. PATENT DOCUMENTS

| | | |
|---|---|---|
| 5,799,907 A | 9/1998 | Andronica |
| 5,851,105 A | 12/1998 | Fric et al. |
| 5,941,592 A | 8/1999 | Hausrath |
| 5,949,593 A | 9/1999 | Lloyd |
| 5,950,997 A | 9/1999 | Metz |
| 5,951,105 A | 9/1999 | Slettebø |
| 5,961,145 A | 10/1999 | Schillinger et al. |
| 5,979,854 A | 11/1999 | Lundgren et al. |
| 6,059,512 A | 5/2000 | Kielinski |
| 6,073,903 A | 6/2000 | Lindsay |
| 6,095,541 A | 8/2000 | Turner et al. |
| 6,102,418 A | 8/2000 | Runkel |
| 6,105,987 A | 8/2000 | Turner |
| 6,120,009 A | 9/2000 | Gatehouse et al. |
| 6,131,937 A | 10/2000 | Coenen |
| 6,158,556 A | 12/2000 | Swierczewski |
| 6,182,925 B1 | 2/2001 | Kilner et al. |
| 6,212,830 B1 | 4/2001 | MacKarvich |
| 6,224,076 B1 | 5/2001 | Kent |
| 6,230,364 B1 | 5/2001 | Cheal |
| 6,283,488 B1 | 9/2001 | Adamek et al. |
| 6,318,025 B1 | 11/2001 | Sedlak |
| 6,331,012 B1 | 12/2001 | Eisenmann, II et al. |
| 6,364,256 B1 | 4/2002 | Neider et al. |
| 6,367,602 B1 | 4/2002 | Chang |
| 6,390,762 B1 | 5/2002 | Peery et al. |
| 6,394,405 B1 | 5/2002 | Roxton et al. |
| 6,418,860 B1 | 7/2002 | Hinderhofer |
| 6,494,443 B2 | 12/2002 | Valdez |
| 6,516,567 B1 | 2/2003 | Stone et al. |
| 6,530,738 B2 | 3/2003 | Maxwell |
| 6,533,306 B2 | 3/2003 | Watkins |
| 6,560,931 B1 | 5/2003 | Cermola |
| 6,601,430 B2 | 8/2003 | McClellan |
| 6,629,322 B1 | 10/2003 | Monroe |
| 6,647,705 B2 | 11/2003 | Ewanochko et al. |
| 6,702,360 B1 | 3/2004 | Santos et al. |
| 6,742,808 B1 | 6/2004 | Kosak |
| 6,749,249 B1 | 6/2004 | Lang |
| 6,789,357 B1 | 9/2004 | McCullough |
| 6,813,961 B1 | 11/2004 | Stiller et al. |
| 6,886,837 B2 | 5/2005 | Gibbs |
| 6,948,728 B2 | 9/2005 | Pflugner et al. |
| 7,144,021 B2 | 12/2006 | Carlson |
| 7,234,757 B2 | 6/2007 | Mitchell |
| 7,284,947 B1 | 10/2007 | Felton |
| 7,293,819 B2 | 11/2007 | Duffy |
| 7,357,376 B2 | 4/2008 | Assmann |
| 7,387,181 B2 | 6/2008 | Adoline et al. |
| 7,406,976 B1 | 8/2008 | Chan et al. |
| 7,543,792 B1 | 6/2009 | Ursel et al. |
| 7,611,189 B2 | 11/2009 | Nielander et al. |
| 7,614,829 B2 | 11/2009 | Thomas, Jr. |
| 7,661,240 B2 | 2/2010 | Sargent |
| 7,797,882 B2 | 9/2010 | Lubaway |
| 7,806,381 B2 | 10/2010 | Sisk Horne et al. |
| 7,814,629 B2 | 10/2010 | Uzun |
| 7,938,473 B2 | 5/2011 | Paton et al. |
| 8,006,817 B2 | 8/2011 | Hanna et al. |
| 8,033,620 B2 | 10/2011 | Retchloff |
| 8,056,183 B2 | 11/2011 | Shoemaker et al. |
| 8,186,620 B2 | 5/2012 | Luce et al. |
| 8,261,892 B2 | 9/2012 | Browne et al. |
| 8,459,590 B2 | 6/2013 | DeVlieg |
| 8,672,284 B2 * | 3/2014 | Klinke ..................... A47B 9/04 248/405 |
| 8,757,699 B2 | 6/2014 | Kalack |
| 8,789,654 B2 | 7/2014 | Campbell et al. |
| 8,814,142 B2 | 8/2014 | Pasto et al. |
| 8,814,189 B2 | 8/2014 | Vitali et al. |
| 8,833,775 B2 | 9/2014 | Kim et al. |
| 8,840,144 B2 | 9/2014 | Armstrong et al. |
| 8,899,901 B2 | 12/2014 | Hilton |
| 8,960,645 B1 | 2/2015 | Stewart |
| 9,022,326 B2 | 5/2015 | Brown et al. |
| 9,033,619 B2 | 5/2015 | Riggle, Jr. |
| 9,045,099 B2 | 6/2015 | Merulla |
| 9,045,237 B2 | 6/2015 | Nance |
| 9,150,076 B2 | 10/2015 | Coombs et al. |
| 9,267,342 B2 | 2/2016 | Hilton |
| 9,400,040 B2 * | 7/2016 | Tseng ..................... F16H 25/20 |
| 9,491,898 B2 | 11/2016 | Laubner et al. |
| 9,504,322 B1 | 11/2016 | McJunkin |
| 9,504,447 B2 | 11/2016 | Messina et al. |
| 9,534,834 B1 | 1/2017 | Klassen |
| 10,544,615 B2 * | 1/2020 | Takizawa ................. F16H 1/46 |
| 2002/0121731 A1 | 9/2002 | Miller et al. |
| 2002/0195258 A1 | 12/2002 | Coenen et al. |
| 2003/0000769 A1 | 1/2003 | Pyle |
| 2003/0177578 A1 | 9/2003 | Nixon et al. |
| 2003/0227113 A1 | 12/2003 | Jensen |
| 2003/0234475 A1 | 12/2003 | Gregory |
| 2004/0104522 A1 | 6/2004 | Wolf et al. |
| 2004/0163334 A1 | 8/2004 | Carlson |
| 2004/0182019 A1 | 9/2004 | Flynn |
| 2005/0232740 A1 | 10/2005 | Cummings |
| 2006/0043717 A1 * | 3/2006 | Baxter ..................... B60S 9/08 280/763.1 |
| 2006/0049605 A1 | 3/2006 | Schuyten |
| 2006/0181108 A1 | 8/2006 | Cleland et al. |
| 2006/0220918 A1 | 10/2006 | Stockwell et al. |
| 2007/0069072 A1 | 3/2007 | Luce |
| 2007/0164527 A1 | 7/2007 | Mathis et al. |
| 2008/0250720 A1 | 10/2008 | Oxley et al. |
| 2008/0315570 A1 * | 12/2008 | Baxter ..................... B60S 9/08 280/766.1 |
| 2009/0184299 A1 | 7/2009 | Pasto |
| 2009/0249904 A1 * | 10/2009 | Chen ..................... F16H 25/20 74/89.23 |
| 2011/0303818 A1 | 12/2011 | Bach et al. |
| 2012/0321426 A1 | 12/2012 | Tanaka et al. |
| 2013/0220551 A1 | 8/2013 | Saito |
| 2013/0327579 A1 | 12/2013 | Nance |
| 2014/0074143 A1 | 3/2014 | Fitzgerald et al. |
| 2014/0145059 A1 | 5/2014 | Anderson et al. |
| 2014/0157917 A1 * | 6/2014 | Oestreich ................. B60S 9/08 74/89.13 |
| 2014/0190315 A1 * | 7/2014 | Kiser ..................... B25B 13/481 81/57.29 |
| 2014/0263915 A1 | 9/2014 | Bernacki |
| 2015/0123059 A1 | 5/2015 | West et al. |
| 2015/0191336 A1 | 7/2015 | Brown |
| 2015/0204426 A1 * | 7/2015 | Wu ..................... F16H 25/20 74/89.28 |
| 2015/0257905 A1 | 9/2015 | Bache |
| 2015/0259179 A1 | 9/2015 | Pa mann et al. |
| 2015/0284079 A1 | 10/2015 | Matsuda |
| 2015/0284983 A1 | 10/2015 | Conner et al. |
| 2015/0333591 A1 | 11/2015 | Cheong et al. |
| 2015/0376929 A1 * | 12/2015 | Scheuring ............. F16D 41/064 74/89.38 |
| 2016/0091134 A1 | 3/2016 | May |
| 2016/0137468 A1 | 5/2016 | Walker |
| 2016/0144694 A1 | 5/2016 | Shchokin et al. |
| 2016/0176539 A1 | 6/2016 | Van Bruggen et al. |
| 2016/0207616 A1 | 7/2016 | Lindahl et al. |
| 2016/0265616 A1 | 9/2016 | Ripa |
| 2016/0312514 A1 | 10/2016 | Leonard et al. |
| 2016/0312876 A1 * | 10/2016 | Demitroff ............. F16H 57/02 |
| 2016/0376130 A1 | 12/2016 | Ma et al. |
| 2017/0044814 A1 | 2/2017 | Scheuring et al. |
| 2017/0049218 A1 | 2/2017 | Moncreiff |
| 2017/0067449 A1 | 3/2017 | Whitehouse et al. |
| 2017/0190351 A1 * | 7/2017 | Kuo ..................... B62D 5/0415 |

* cited by examiner

STRUT EXTENDER MECHANISM

CROSS-REFERENCE TO RELATED APPLICATIONS

This application claims priority to U.S. Provisional Patent Application No. 62/490,294, filed on Apr. 26, 2017, which is expressly incorporated herein by reference in its entirety for any and all non-limiting purposes.

BACKGROUND

An adjustable strut may be utilized to brace an unstable structure. For example, one or more adjustable struts may be positioned to brace one or more unstable structures of a vehicle following an accident. In another example, one or more adjustable struts may be positioned to bear part, or all, of a weight of a wall, a ceiling, or a roof of an unstable structure. In yet another example, one or more adjustable struts may be positioned to reinforce one or more damaged structures within a ship, such as bulkheads, sections of a hull, or one or more hatches. Accordingly, an adjustable strut may be utilized by emergency services, or other users, in time-sensitive situations where there is a possibility of structural failure of one or more load-bearing elements.

In one example, an adjustable strut may comprise a pair of structural members configured to allow a user to adjust a length of the strut between a contracted position, configured for ease of portability and storage, and a fully-extended position. As such, a first structural member of an adjustable strut may be configured to slide into a bore of a second structural member in order to facilitate adjustment of a length of the strut as needed to brace an unstable structure. Often however, a user does not know the necessary length of the strut until one arrives at the location of the unstable structure. Further, standard adjustable struts are designed for shoring and bracing, and do not have the capability to alternatively function as a lifting device to an unstable structure. Rather, users must utilize independent devices such as pneumatic bags, pneumatic lifts, jacks, or other lifting means in conjunction with strut when a user needs a lifting device, and the user will then need to independently adjust the strut to properly brace/shore the lifted object in its new position.

Accordingly, a need exists for a device that allows an adjustable strut that is easily adjustable and can also function as a lifting device.

BRIEF SUMMARY

One or more of the above-mentioned needs in the art are satisfied by aspects described herein. According to one aspect, an adjustable strut may have an outer housing configured to receive an extendable member into a contracted position. The extendable member may have a threaded exterior along a portion or all of its length. The outer housing may have an extending mechanism attached to the top or placed on top of (e.g., onto the top edge) of the outer housing. The extending mechanism may be removable from, integrated into, or permanently fixed to the outer housing. The extending mechanism is configured to receive, engage, and/or contact at least a portion of the extendable member (e.g., a defined length of the threaded section or other section of the exterior of the extendable member). The extending mechanism may further have a gear system that engages with the threaded exterior of the extendable member so that user can adjust the length of the strut by extending or retracting the extendable member. Further, in adjusting the length of the strut, the extending mechanism allows the adjustable strut to also be used as a lifting device if already connected to a structure such as a vehicle.

According to another example aspect, the extending mechanism may also have an internal collar that engages the threaded exterior of the extendable member, for example by having threading sized and pitched to correspond to threads of the extendable member. The gear system may consist of at least two bevel gears. At least one bevel gear is attached to the internal collar of the extending mechanism so that rotating this bevel gear causes the internal collar of the extending mechanism to rotate. The at least one other bevel gear includes a shaft that extends away from the extending mechanism. By rotating this bevel gear's shaft, the gear system translates rotational motion caused by the user into rotational motion of the internal collar of the extending mechanism (e.g., the shaft may be connected to a handle, drill, or other mechanical device capable of providing rotational motion, or other device configured to power the extending mechanism such as pneumatic motor, hydraulic motor, an air motor, or an air ratchet, where these motors and/or power sources may be internal to the extending mechanism, external, and/or configured to supply rotation and/or power from a distance). This rotational motion of the internal collar of the extending mechanism, which in turn causes rotation of threads of the internal collar of the extending mechanism, interacts with the threads of the extendable member of the strut, causing the strut to move up or down depending on the direction of the rotation of the internal collar, to allow a user to adjust the length of the strut and selectively lift an object.

According to another example aspect, the gear system may consist of at least two bevel gears, at least one drive gear (e.g., a conical gear), and a worm drive that includes at least one worm that interacts with at least one worm gear. In this configuration, at least one bevel gear includes a shaft that extends away from the extending mechanism. This bevel gear interacts with the at least one other bevel gear, causing the other bevel gear to rotate on a different axis from the first bevel gear. The second bevel gear may share the same axis and shaft of the worm. When the second bevel gear turns, it causes the worm to turn, which interacts with the at least one worm gear, causing the worm gear to turn. The worm gear shares the same axis and shaft of the at least one drive gear. By turning the at least one worm gear, the at least one drive gear interacts with the threads of the extendable member to adjust the length of the strut.

This Summary is provided to introduce a selection of concepts in a simplified form that are further described below in the Detailed Description. The Summary is not intended to identify key features or essential features of the disclosed subject matter, nor is it intended to be used to limit the scope of the disclosed subject matter.

BRIEF DESCRIPTION OF THE DRAWINGS

The present disclosure is illustrated by way of example and not limited in the accompanying figures in which like reference numerals indicate similar elements and in which.

Further, it is to be understood that the drawings may represent the scale of different components of two embodiments; however, the disclosed embodiments are not limited to that particular scale.

DETAILED DESCRIPTION

Aspects of this disclosure relate to an extending mechanism for an adjustable strut configured to allow a user to easily adjust the length of the strut for structural bracing. The extending mechanism may further allow the user to use the adjustable strut as a lifting device.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure.

Figure 1:
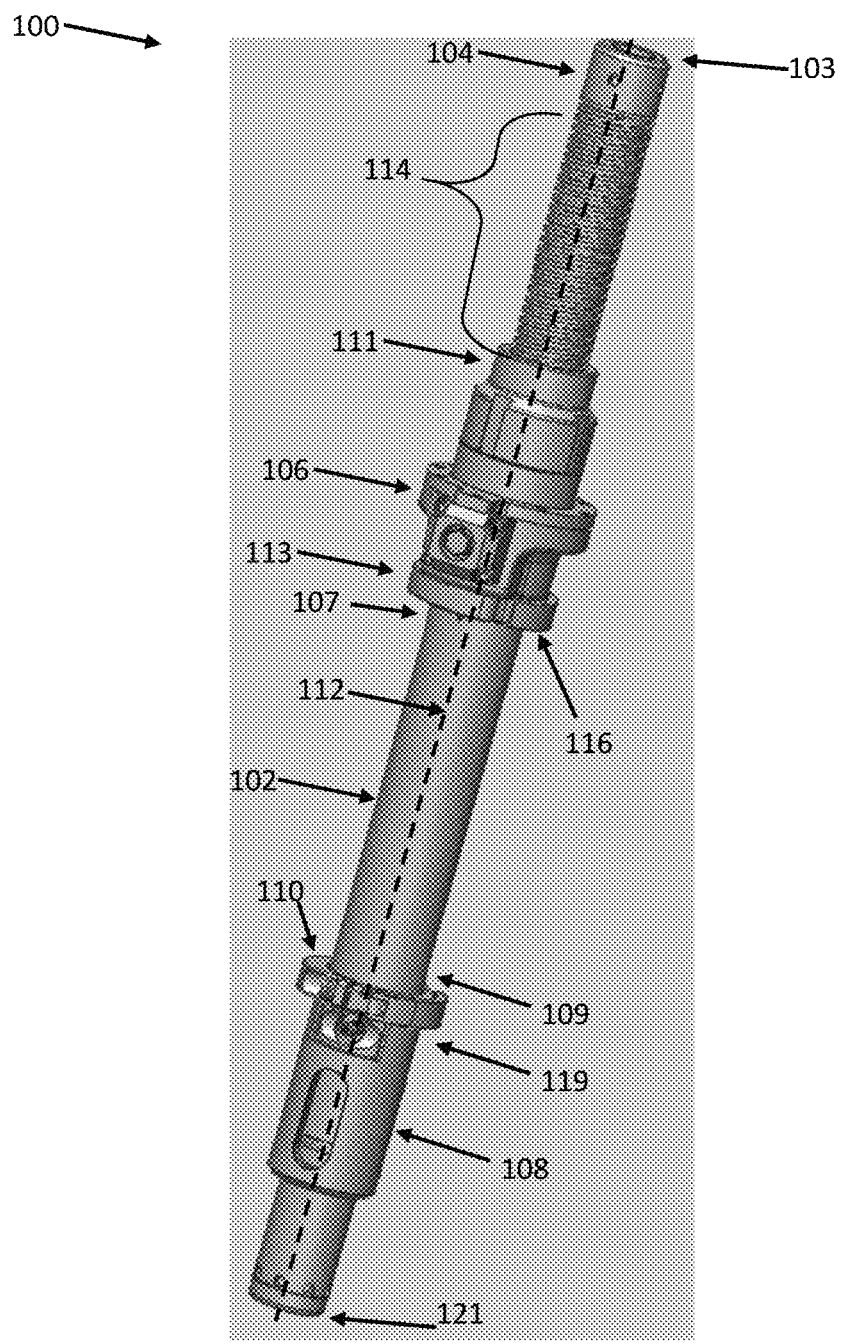
FIG. 1 depicts a view of one embodiment an adjustable strut with an extending mechanism, according to one or more aspects described herein.

FIG. 1 depicts an embodiment of an adjustable strut 100, according to one or more aspects described herein. In particular, FIG. 1 depicts an adjustable strut 100 that has a first end 103 and a second end (not depicted) spaced apart along a central axis 112, otherwise referred to as a longitudinal axis 112. The adjustable strut 100 also includes an outer housing 102, an extendable member 104, an extending mechanism 106, and a lock structure 108 coupled to the outer housing 102.

In one example, the outer housing 102 has a first end 107 spaced apart from a second end 109 along a central axis that may be co-linear with axis 112. The extending mechanism 106 may have a first end 111 spaced apart from a second end 113 along a central axis that may be co-linear with axis 112. Additionally, the lock structure 108 may have a first end 115 spaced apart from a second end 117 along a central axis that may co-linear with axis 112. Further, the lock structure 108 may have a first end 119 and a second end 121 spaced apart along a central axis that may be co-linear with axis 112. The second end 113 of the extending mechanism 106 may be removably coupled to the first end 107 of the outer housing 102. This removable coupling may use any removable coupling mechanism or elements, including, among others, one or more screws, bolts, pins, spring-loaded pins, or a latch mechanism 116. Similarly, the second end 109 of the outer housing 102 may be removably coupled to the first end 115 of the lock structure 108. This removable coupling may also use any removable coupling mechanism, including latch mechanism 110. In one example, when coupled together, the extending mechanism 106, the outer housing 102, and the lock structure 108 may have a central bores that are aligned along axis 112 and equal in diameter such that they connect to form a single bore configured to receive the extending member 104. It is further contemplated that where described throughout this disclosure, a removable coupling may be implemented as a rigid, non-removable coupling, without departing from the scope of these disclosures.

Lock structure 108 may attach the adjustable strut to a structure such as a base, e.g. to allow bracing against the ground, while also inhibiting the rotation of outer housing 102. Specifically, lock structure 108 configured with a bore (not shown) that is sized to receive outer housing 102. Once outer housing 102 is placed within lock structure 108, latch 110 may be used to secure lock structure 108 onto outer housing 102 and prevent outer housing 102 from rotating when using the adjustable strut (for example, when lifting the strut via threading, and therefore rotation of an upper component as described in certain examples herein, when the top of the strut is braced against an object like an automobile, which could encourage counter-rotation of the lower components). Lock structure 108 may then be placed in and/or connected to a base (not shown) that, for example, attaches to the surface of a structure that is to be supported or is designed to be placed on the ground. The lock structure may include one or more apertures or holes configured to receive a pin or other engaging structure from the base, to prevent rotation of the lock structure, and therefore the outer housing, relative to the base. The lock structure may have sufficient dimensions such that the lock structure is secured onto the exterior of the outer housing itself rather than components at the end of the strut (e.g. a component extending from the bottom of the outer housing) that may be glued or otherwise have less structural strength. The base (not shown) may include a flat platform to facilitate bracing against the ground or another structure, and may include components facilitating tilting or angling of the base (or portions thereof) to adjust to the contours of possible bracing surfaces. In some examples, however, no lock structure is needed and the strut may be used without a separate base, or may be directly attached to such a brace. In certain examples, no lock structure is needed as the strut is lifted without rotation of the primary strut components themselves (e.g. the extendable member), as described in certain examples herein.

In this embodiment, extendable member 104 may be configured to move relative to outer housing 102 and extending mechanism 106 along a longitudinal axis 112. As such, both the outer housing 102 and extending mechanism 106 may be configured with bores (not shown), and the extendable member 104 may be sized to be received into these bores. As shown, extendable member 104 may also have a thread structure 114 (one or more helical grooves) along a longitudinal length of at least a portion of an outer surface of the extendable member 104.

Figure 2:
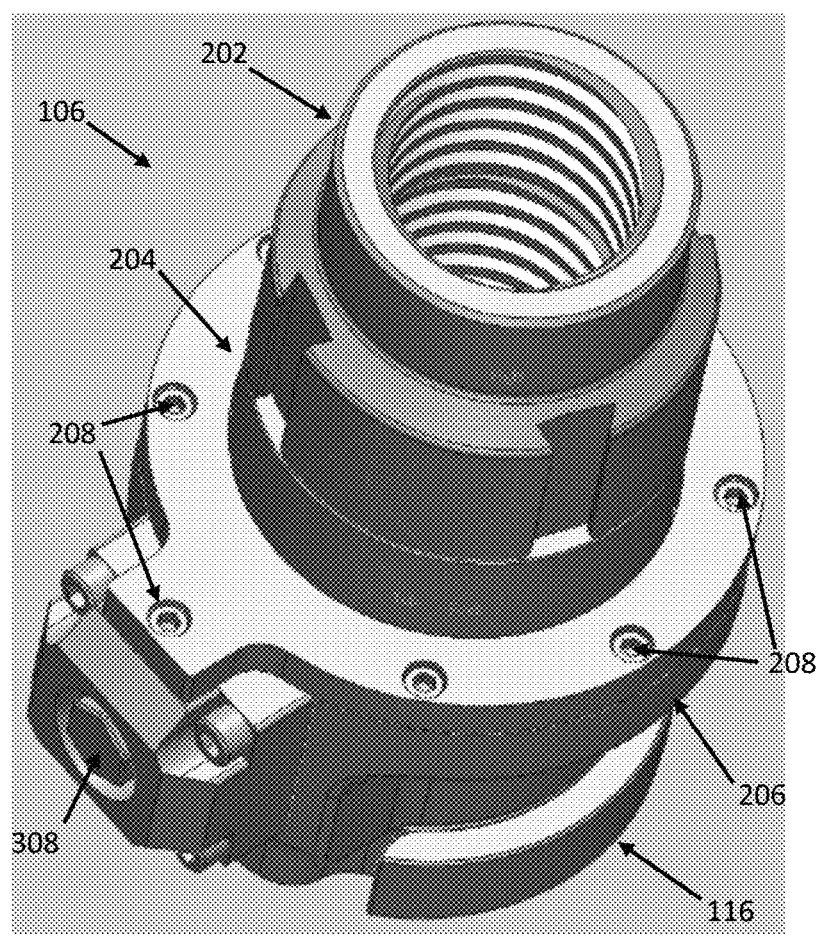
FIG. 2 depicts a view of an extending mechanism of one embodiment of an extending mechanism for an adjustable strut device, according to one or more aspects described herein.

Extending mechanism 106 attaches to a first end of the outer housing 102. As shown in FIGS. 1 and 2, this embodiment attaches the extending mechanism 106 to the outer housing 102 using latch mechanism 116. The extending mechanism 106 may be attached to the outer housing 102 with a variety of apparatuses and methods. In some examples, the extending mechanism 106 is designed to be placed on top of the existing edge of the outer housing, meaning no additional components or features such as an exterior shelf are required. The latch mechanism may then tighten or fix the extending mechanism onto the exterior and/or top edge of the outer housing. In other examples, the extending mechanism is integrated, welded, riveted, or otherwise fixed to the outer housing.

FIG. 2 depicts an embodiment of extending mechanism 106 without the outer housing 102 and extendable member 104 of the adjustable strut. The extending mechanism includes a threaded nut 202, an upper housing 204, and a lower housing 206. The threaded nut 202 is not attached to the upper housing 204. However, the upper housing 204 is attached to the lower housing 206, in this instance, using bolts 208. A number of mechanisms or features may be used to attach the upper housing 204 to the lower housing 206.

In one example, the threaded nut 202 is made out of steel, aluminum, or some other metal and may be configured to engage with the thread structure 114 of the extendable member 104, such that the threaded nut 202 may linearly-translate along the longitudinal length of the extendable member 104 by screwing the threaded nut 202 along the thread structure 114 of the extendable member 104. One benefit of the threaded nut 202 is that after a lift is performed (e.g., where the threaded nut moves up with the extendable member), a user may move the threaded nut 202 along the longitudinal length of the extendable member 104 until it makes contact with the upper housing 204, thus providing additional bracing support.

Figure 3:
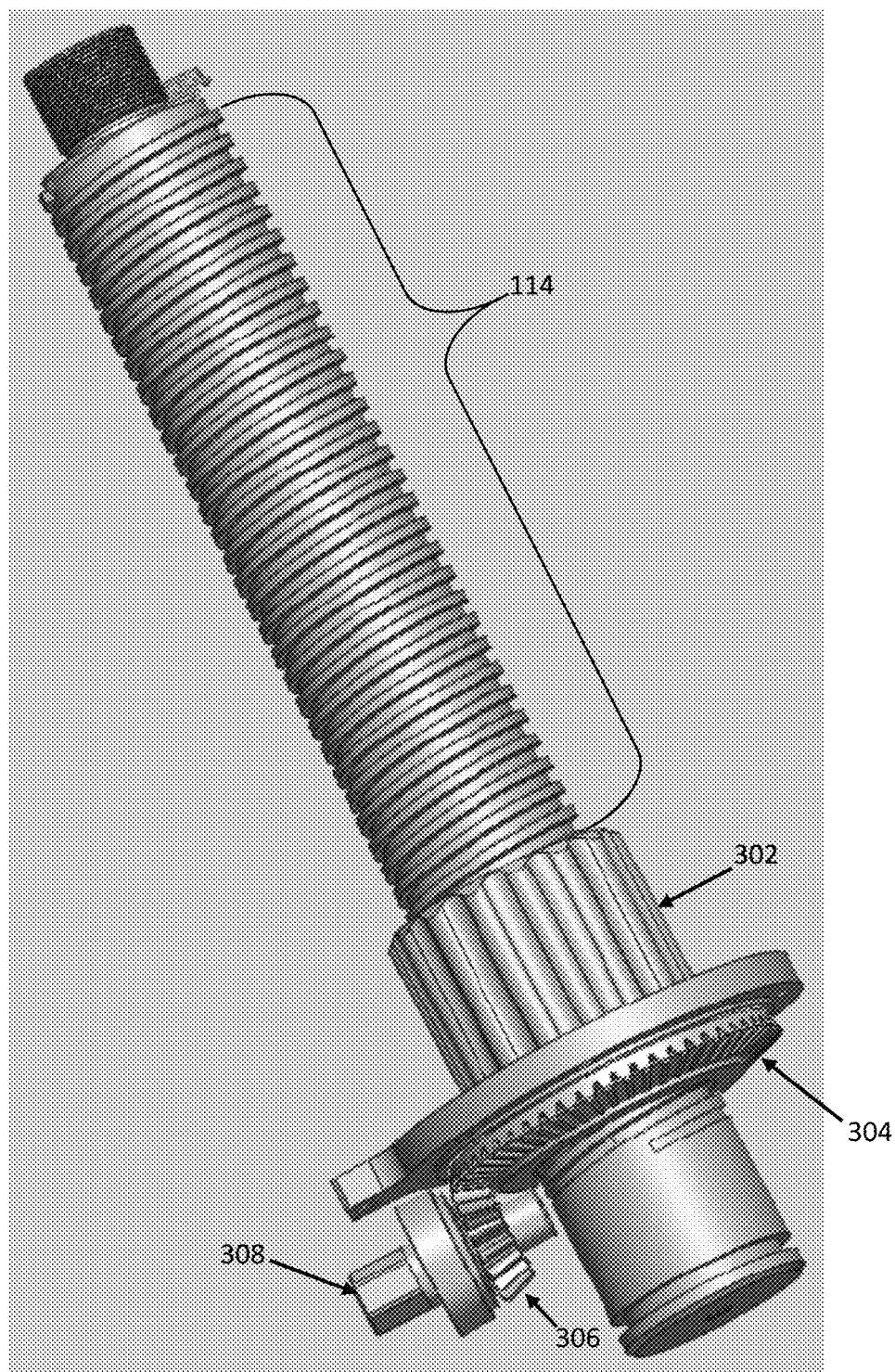
FIG. 3 depicts one embodiment of a gear system for an extending mechanism for an adjustable strut, according to one or more aspects described herein.

FIG. 3 schematically depicts an embodiment of extendable member 104 and a portion of the extending mechanism 106 removed in order to better show the extending mechanism's functionality. Specifically, at least both the upper housing 204 and lower housing 206 have been removed. Removing the upper housing 204 exposes a threaded collar 302 that is configured with a bore (not shown) that receives the extendable member 104. Further, the threaded collar 302 may also have a threaded bore (not shown) that interacts with the thread structure 114 of the extendable member 104. The threaded collar 302 may be made of or comprise a plastic material or some other material that provides reduced friction between the threaded collar 302 and structure 114 of the extendable member 104 (as compared to the frictional forces that would be present with direction contact with the threads of the extendable member, i.e., providing a lower coefficient of friction). The relatively lower friction material may consist of or comprise a thermoplastic material, such as polypropylene or polyoxymethylene (acetal), among others. Further, in an alternative embodiment, one may combine threaded nut 202 with threaded collar 302 into one piece. For example, a composite piece may incorporate both harder materials (e.g., steel, aluminum, and/or other metals or metallic alloys) to provide shoring/bracing support and have a lower friction material inset, fixed, or connected to a portion of the piece (e.g., in threads within the metal material) to facilitate lifting via a lower friction material that facilitates relative rotation of the threads of the extendable member.

In this embodiment, the threaded collar 302 is attached to bevel gear 304, which also has a bore that receives the extendable member 104. When bevel gear 304 turns, it causes threaded collar 302 to turn. Bevel gear 304 interacts with bevel gear 306. Bevel gear 306 has shaft 308, otherwise referred to as input shaft 308, which extends away from extending mechanism 106. By turning shaft 308, a user causes bevel gear 306 to turn bevel gear 304, which in turn causes threaded collar 302 to rotate. The interaction between the threaded bore of threaded collar 302 with the thread structure 114 of the extendable member 104 allows a user to both adjust the length of the strut and utilize the adjustable strut as a lifting device. Further, a user may use any number of implements to rotate shaft 308 including a power drill, hand crank, etc. Various implements may be used to rotate shaft 308 without departing from the scope of the disclosures described herein.

Figure 4A:
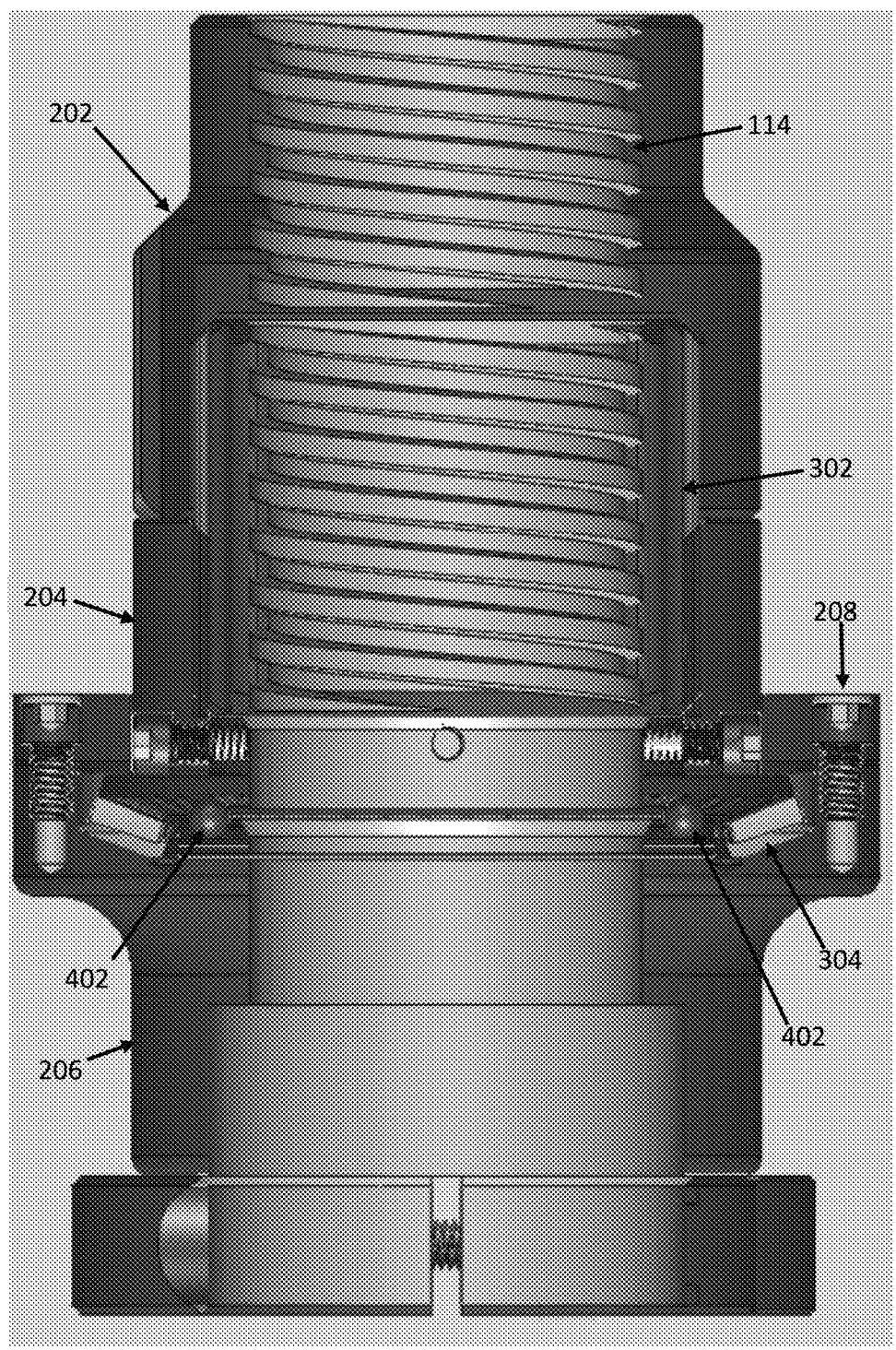
FIGS. 4A-B are cross-sectional views of one embodiment of an adjustable strut with an extending mechanism, focusing on the extending mechanism, according to one or more aspects described herein.
Figure 4B:
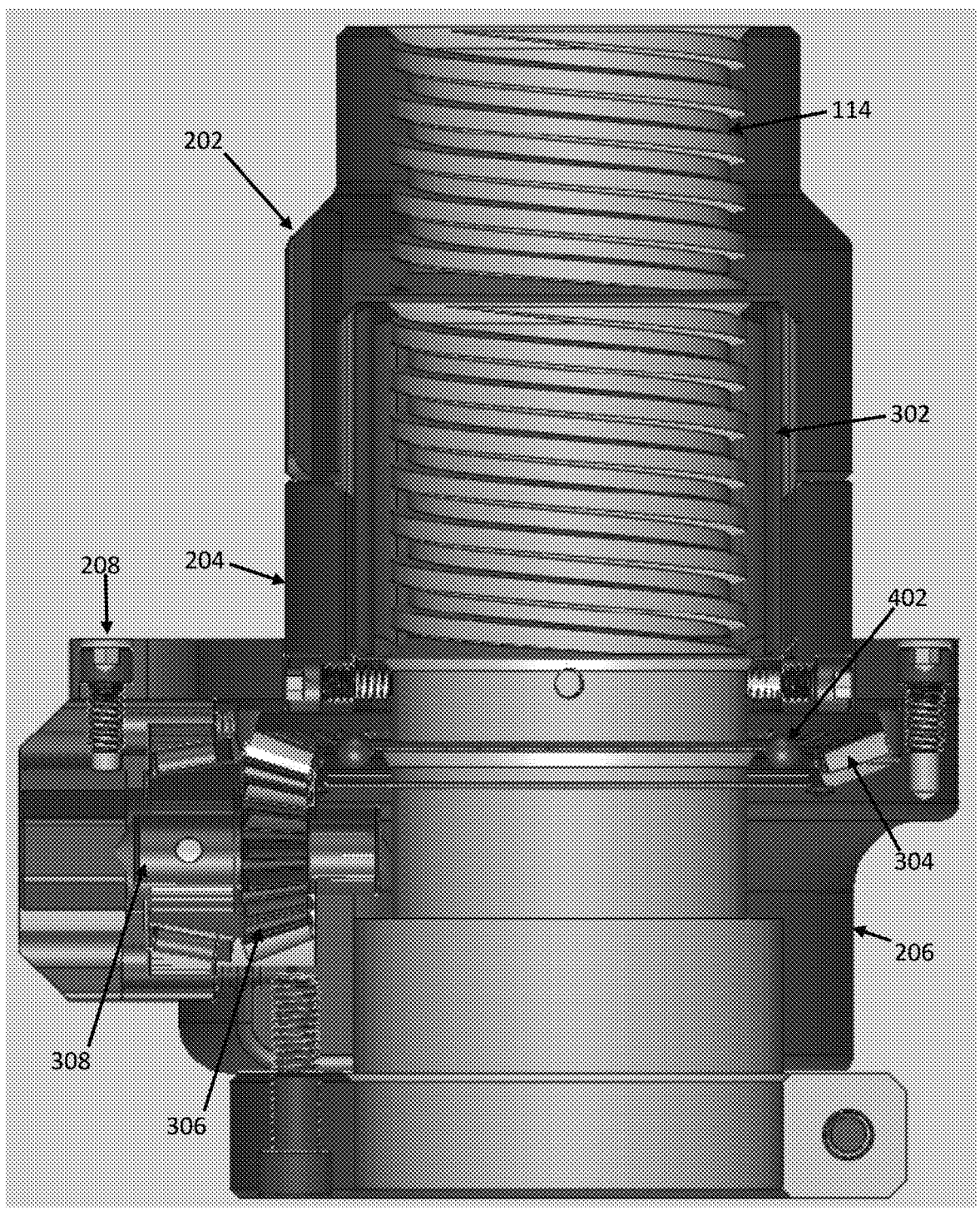

FIGS. 4A and 4B schematically depict cross-sectional views of an embodiment of extending mechanism 106 as well as the extendable member 104. As depicted, these cross sections show the threaded nut 202, the upper housing 204, the lower housing 206, threaded collar 302, bevel gear 304, and bevel gear 306, which includes shaft 308. Further, these cross-sections show the bearing races 402 and bearing balls 402 that facilitate the relative movement of the bevel gear 304 and the lower housing 206. Although ball bearings are used in this embodiment, other bearing systems available to be used. Various lubricants may be used in addition to or instead of bearing components.

Figure 5:
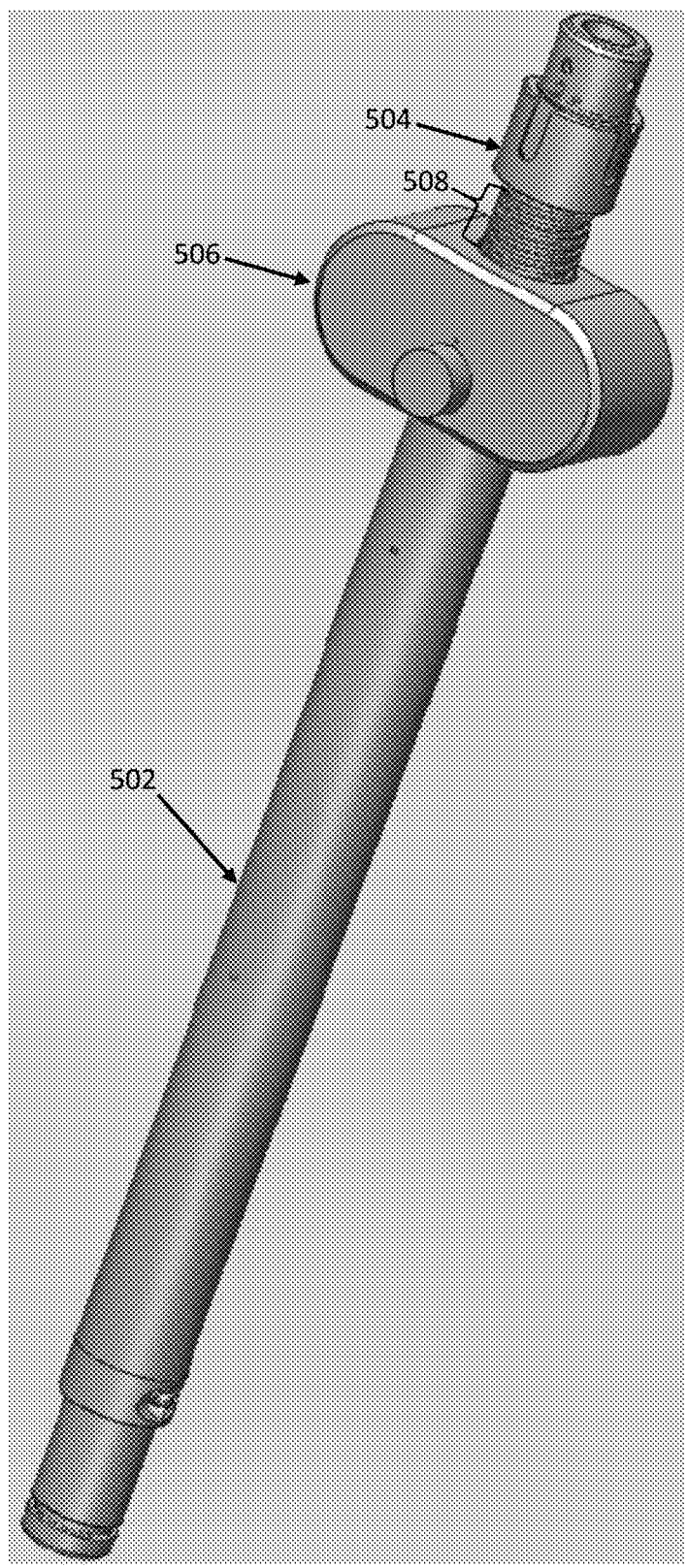
FIG. 5 depicts a view of a second embodiment an adjustable strut with an extending mechanism, according to one or more aspects described herein.

FIG. 5 depicts another embodiment of an adjustable strut with an extending mechanism. In particular, FIG. 5 shows an outer housing 502, an extendable member 504, an extending mechanism 506. In one example, the outer housing 502 may be similar to the outer housing 102 schematically depicted in FIG. 1. Further, extendable member 504 may be similar to extendable member 104 from FIG. 1. For instance, extendable member 504 may also have a thread structure 508 (one or more helical grooves) along a longitudinal length of an outer surface (or a portion thereof) of the extendable member 504, similar to thread structure 114.

Figure 6:
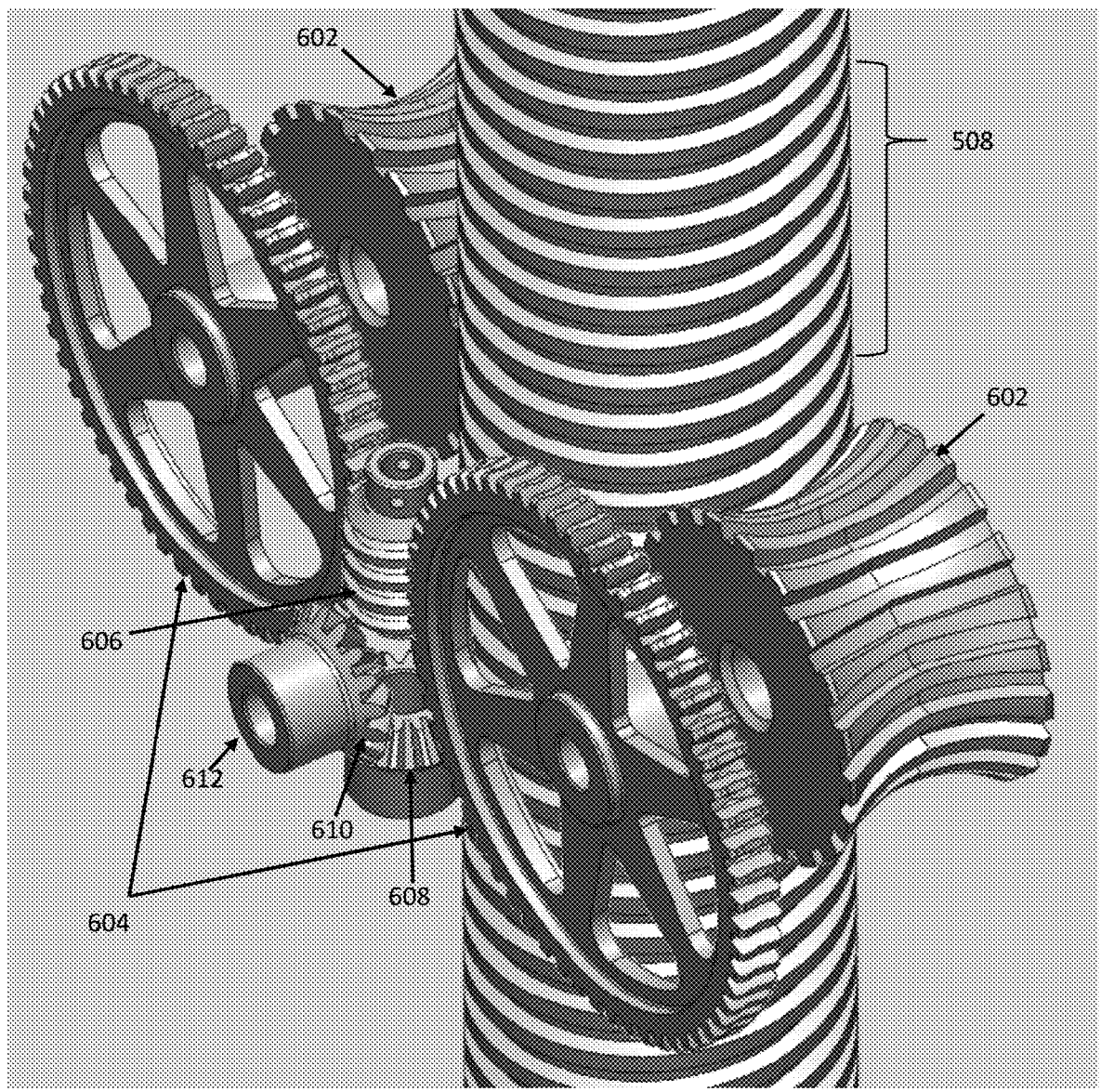
FIG. 6 depicts a second embodiment of a gear system for an extending mechanism for an adjustable strut, according to one or more aspects described herein.

FIG. 6 schematically depicts a gear mechanism from the adjustable strut and extending mechanism shown in FIG. 5. Specifically, FIG. 6 shows a portion of thread structure 508 of extendable member 504 and an example of the gear system of extending mechanism 506.

The gear system of extending mechanism 506 includes two drive gears 602 (pictured here as two conical gears), two worm gears 604, worm 606, and bevel gears 608 and 610. In this embodiment, when bevel gear 610 rotates, it interacts with bevel gear 608, causing it to rotate. A user may cause the rotation of shaft 612 of bevel gear 610 by using any number of implements to rotate shaft 612 including a power drill, hand crank, etc. Various implements may be used to rotate shaft 612 without departing from the scope of the disclosures described herein.

As depicted in FIG. 6, bevel gear 608 and worm 606 are on the same axis and may share a same the shaft (not shown). Consequently, the rotation of bevel gear 608 causes worm 606 to rotate. Worm 606 interacts with the two worm gears 604. Therefore, the rotation of worm 606 causes the two worm gears 604 to also rotate. The two worm gears 604 and the two drive gears 602 are on the same axes and may share respective shafts (not shown). Consequently, the rotation of the two worm gears 604 causes the two drive gears 602 to also rotate. The two drive gears 602 interact with the thread structure 508 of extendable member 504. Therefore, the rotation of the two drive gears 602 causes the extendable member 504 to move longitudinally in relation to outer housing 502. This movement allows a user to not only adjust the length of the adjustable strut, but also use the adjustable strut as a lifting device. In comparison to the embodiment of FIGS. 1-4, the embodiment shown in FIGS. 5 and 6 have a possible advantage of not requiring extendable member 504 to rotate when adjusting the length of the strut.

Figure 7:
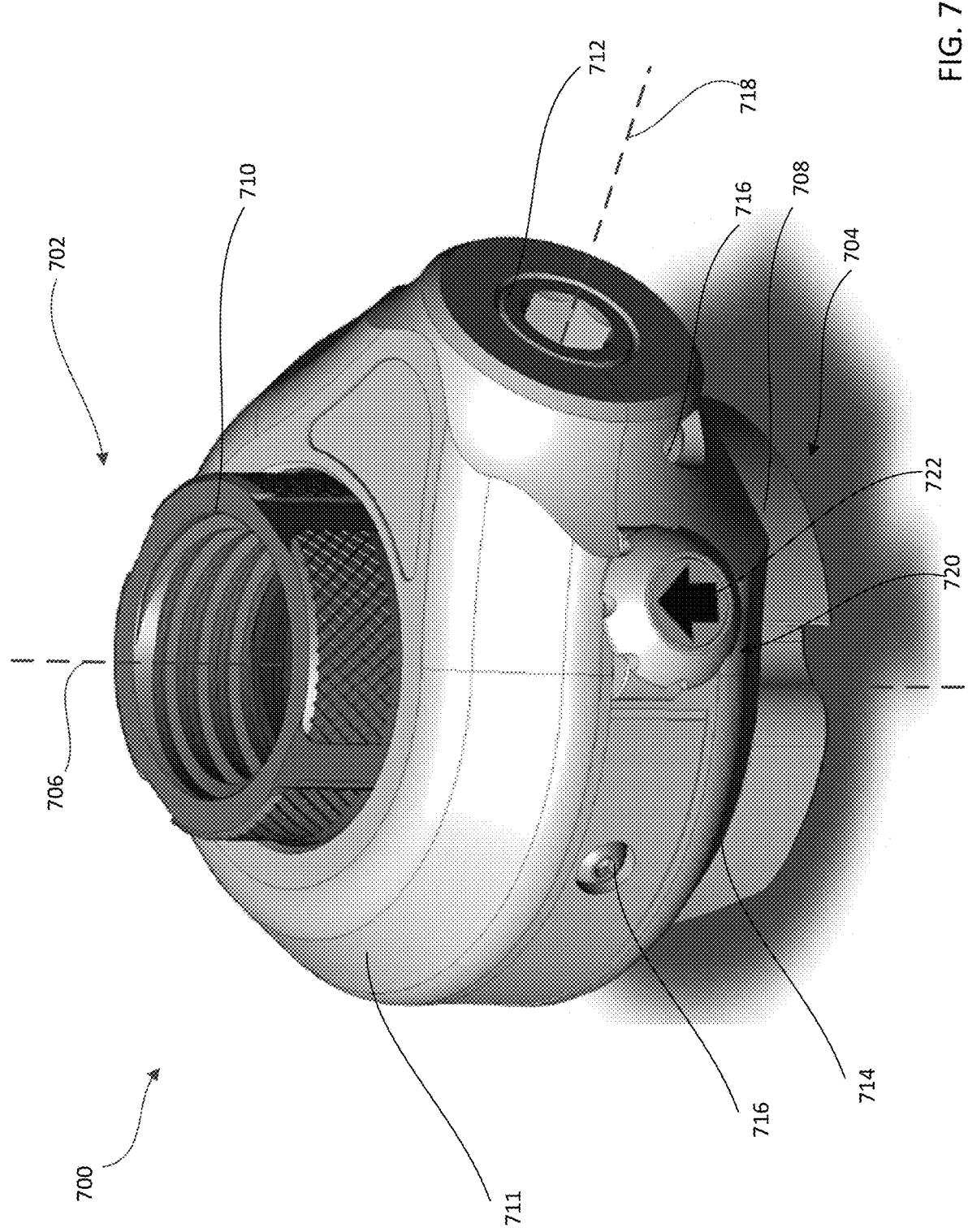
FIG. 7 depicts an isometric view of another implementation of an extending mechanism, according to one or more aspects described herein.

FIG. 7 depicts an isometric view of another implementation of an extending mechanism 700, according to one or more aspects described herein. The extending mechanism 700 may be similar to extending mechanism 106 described in relation to FIG. 2. In one example, the extending mechanism 700 may be configured to be used in place of the extending mechanism 106 within the adjustable strut 100 assembly described in relation to FIG. 1. Accordingly, the extending mechanism 700 may have a first end 702 that is spaced apart from a second end 704 along a central axis 706. The second end 704 of the extending mechanism 700 may be configured to be removably coupled to a first end 107 of the outer housing 102. The removable coupling of the second end 704 of the extending mechanism 700 to the first end 107 of the outer housing 102 may use a latch 708, which may be similar to latch 116. Additionally, the central axis 706 may be configured to align with the central axis 112 of the adjustable strut 100.

The extending mechanism 700 may include a threaded nut 710 similar to the threaded nut 202. Accordingly, the thread structure 114 extendable member 104 is configured to be screwed onto the threaded nut 710 and into the extending mechanism 700. Additionally, the extending mechanism 700 may include an upper housing 711 that is coupled to a lower housing 714. In one example, the upper housing 711 is coupled to the lower housing 714 by one or more bolts 716. However, it is contemplated that any coupling mechanism or elements may be used, and that the coupling elements used to couple the upper housing 711 to the lower housing 714 may be positioned in different locations to those depicted in FIG. 7, without departing from the scope of these disclosures.

Socket 712 may be configured to receive an input shaft (not depicted), and said input shaft may be configured to transmit rotational input kinetic energy to drive a gear system housed within the upper housing 711 and the lower housing 714. In one example, the input shaft received into the socket 712 may be connected to a crank handle configured to be manually operable. Alternatively, the socket 712 may be rotated by a mechanically driven shaft. It is contemplated that any energy source may be used to drive the input shaft to the socket 712, such as an electric motor, a pneumatic motor, a hydraulic motor, or a combustion engine, among others. This gear system is described in further detail in relation to FIG. 8. The rotation of the input shaft and the socket 712 may be about axis 718, and axis 718 may be perpendicular to axis 706. In one example, the coupling of the socket 718 to an input shaft (not depicted) may be similar to the shaft 308 described in relation to FIG. 2. Additionally, socket 712 may alternatively be referred to as shaft 712 to describe the scenario when a shaft is driving the input to the gear system. As depicted, socket 712 may have a hexagonal geometry configured to receive a corresponding hexagonal shaft. It is contemplated, however, that any socket geometry may be used, without departing from the scope of these disclosures. The extending mechanism 700 additionally includes a directional lock 720, which is configured to allow the socket 718, and the gear system coupled to the socket 718, to rotate in one direction only. The directional lock 720 may be adjustable between a first configuration (as depicted in FIG. 7 with arrow 722 pointing upward) and a second configuration (with arrow 722 pointing downward). In one example, when positioned in the first configuration, as depicted in FIG. 7, the directional lock 720 may only allow the socket 712 to rotate in a direction that results in the extendable member 104 moving in the direction indicated by arrow 722. Similarly, when positioned in the second configuration, with arrow 722 facing the opposite direction to that depicted in FIG. 7, the directional lock 720 may only allow the socket 712 to rotate in a direction that results in the extendable member 104 moving in that opposite direction.

Figure 8:
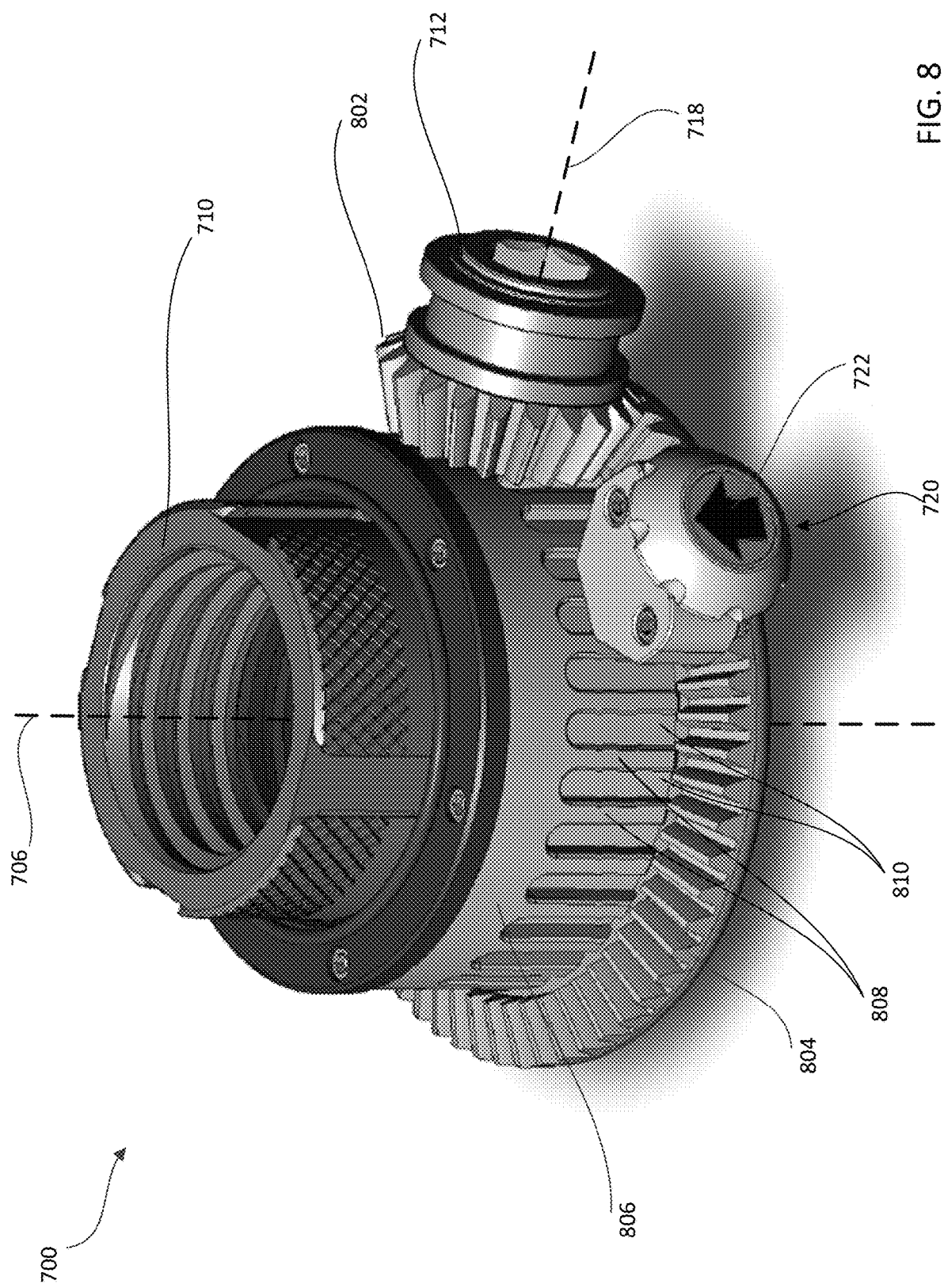
FIG. 8 schematically depicts an isometric view of the extending mechanism of FIG. 7, according to one or more aspects described herein.

FIG. 8 schematically depicts an isometric view of the extending mechanism 700 with at least the upper housing 711 and the lower housing 714 removed. In one example, the socket 712 is coupled to a first bevel gear 802, and the first bevel gear 802 may be configured to rotate about the axis 718. Accordingly, the first bevel gear 802 may be similar to bevel gear 306. A second bevel gear 804 may be configured to mate with an rotate in response to rotational motion of the first bevel gear 802. The second bevel gear 804 may rotate about axis 706, and may be rigidly coupled to a threaded collar 806. Accordingly, the second bevel gear 804 may be similar to bevel gear 306, and the threaded collar 806 may be similar to threaded collar 302.

The threaded collar 806, otherwise referred to as a drive collar 806, may be configured to rotate about the axis 706, and may have an in internal threaded surface (not depicted) configured to mate with the thread structure 114 of the extendable member 104. Accordingly, the internal threaded surface of the threaded collar 806 may be configured to urge the extendable member 104 to translate linearly along axis 706 in response to input rotational kinetic energy about axis 718. In one implementation, the internal threaded surface of the threaded collar 806 may be constructed from a material with a lower coefficient of friction than the thread structure 114 of the extendable member 104. In one example, the internal threaded surface of the threaded collar 806 may be constructed from one or more polymeric materials, among others. The threaded collar 806 additionally includes external teeth 808 and cavities 810, which are configured to engage with the direction lock 720, as described in further detail in relation to FIG. 9. In the implementation depicted in FIG. 8, the first bevel gear 802 is positioned above the second bevel gear 804, or closer to the first end 702 of the extending mechanism 700 than the second bevel gear 804. Accordingly, as implemented, clockwise rotation of the input socket 712 results in linear motion of the extendable member 104 along central axis 706 in a direction indicated by arrow 722.

Figure 9:
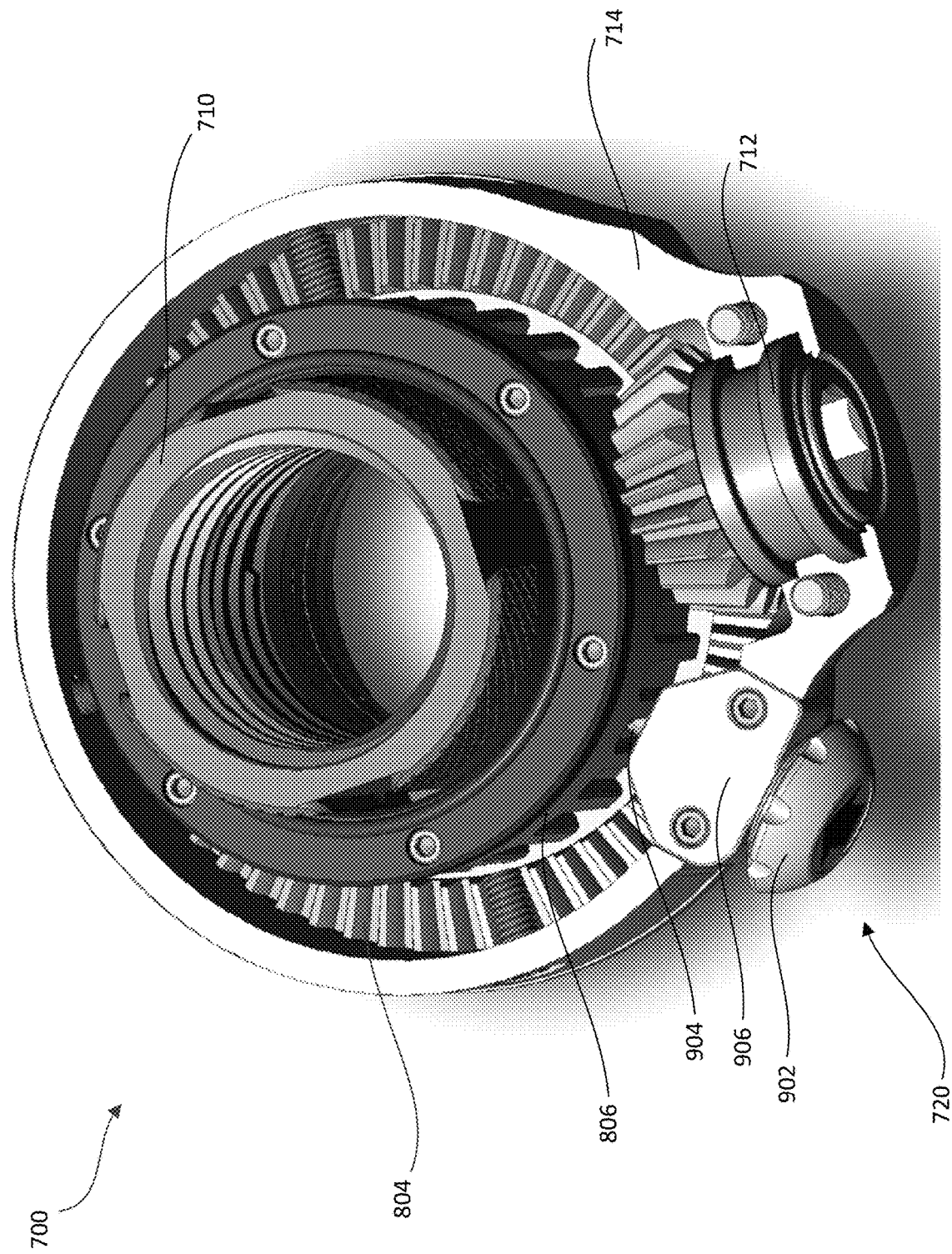
FIG. 9 depicts another view of the extending mechanism of FIG. 7, according to one or more aspects described herein.

FIG. 9 depicts another view of the extending mechanism 700 with at least the upper housing 711 removed. In one example, the directional lock 720 includes a directional lock housing 906 that is rigidly coupled to the lower housing 714. The directional lock 720 may additionally include a direction knob 902 that is coupled to a spring-loaded pawl element 904. Accordingly, the spring-loaded pawl element 904 may have a geometry that results in the pawl element being driven back into the directional lock housing 906 when the threaded collar 806 is rotating in one direction as a result of an interaction between the spring-loaded pawl element 904 and the sidewalls of the cavities 810. However, the geometry of the pawl element 904 may prevent it from being driven back into the directional lock housing 906 when the threaded collar 806 is rotating in the opposite direction. In one implementation, the direction knob 902 may be rotated about 180° in order to change the orientation of the spring-loaded pawl element 904, and thereby allow rotation of the threaded collar 806 in the opposite direction.

Figure 10:
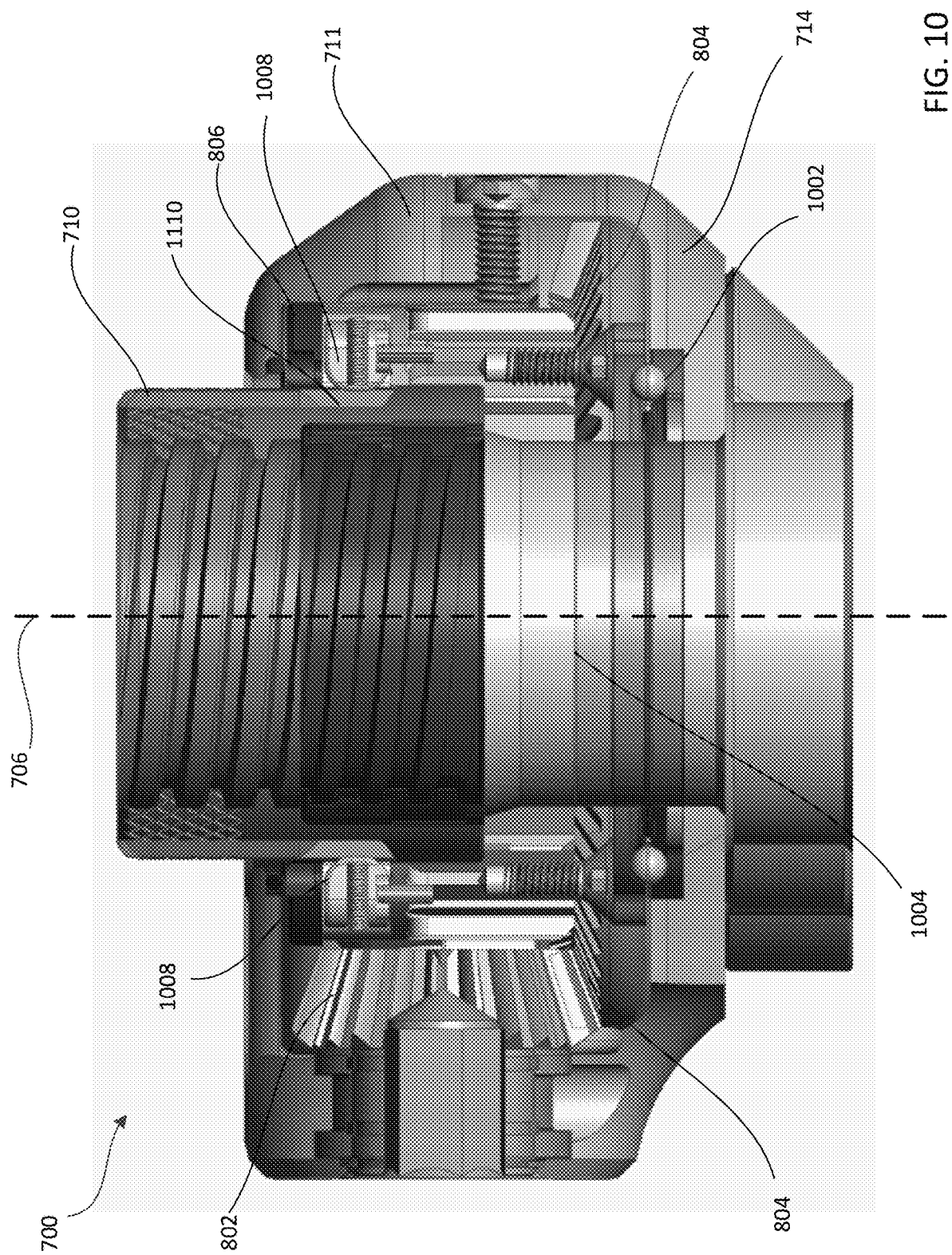
FIG. 10 schematically depicts a cross-sectional view of the extending mechanism of FIG. 7, according to one or more aspects described herein.

FIG. 10 schematically depicts a cross-sectional view of the extending mechanism 700, according to one or more aspects described herein. FIG. 10 depicts a ball bearing race 1002 on which the second bevel gear 804 is configured to rotate relative to the lower housing 714. FIG. 10 also depicts the internal threaded surface 1004 of the threaded collar 806.

In one implementation, the threaded nut 710 may be removably coupled to the threaded collar 806 such that the threaded nut 710 may rotate the threaded collar 806. In one example, a spring-loaded coupling mechanism 1008 may be configured to be received into a cavity 1110 of threaded nut 710 to removably couple the threaded nut 710 to the threaded collar 806.

Figure 11:
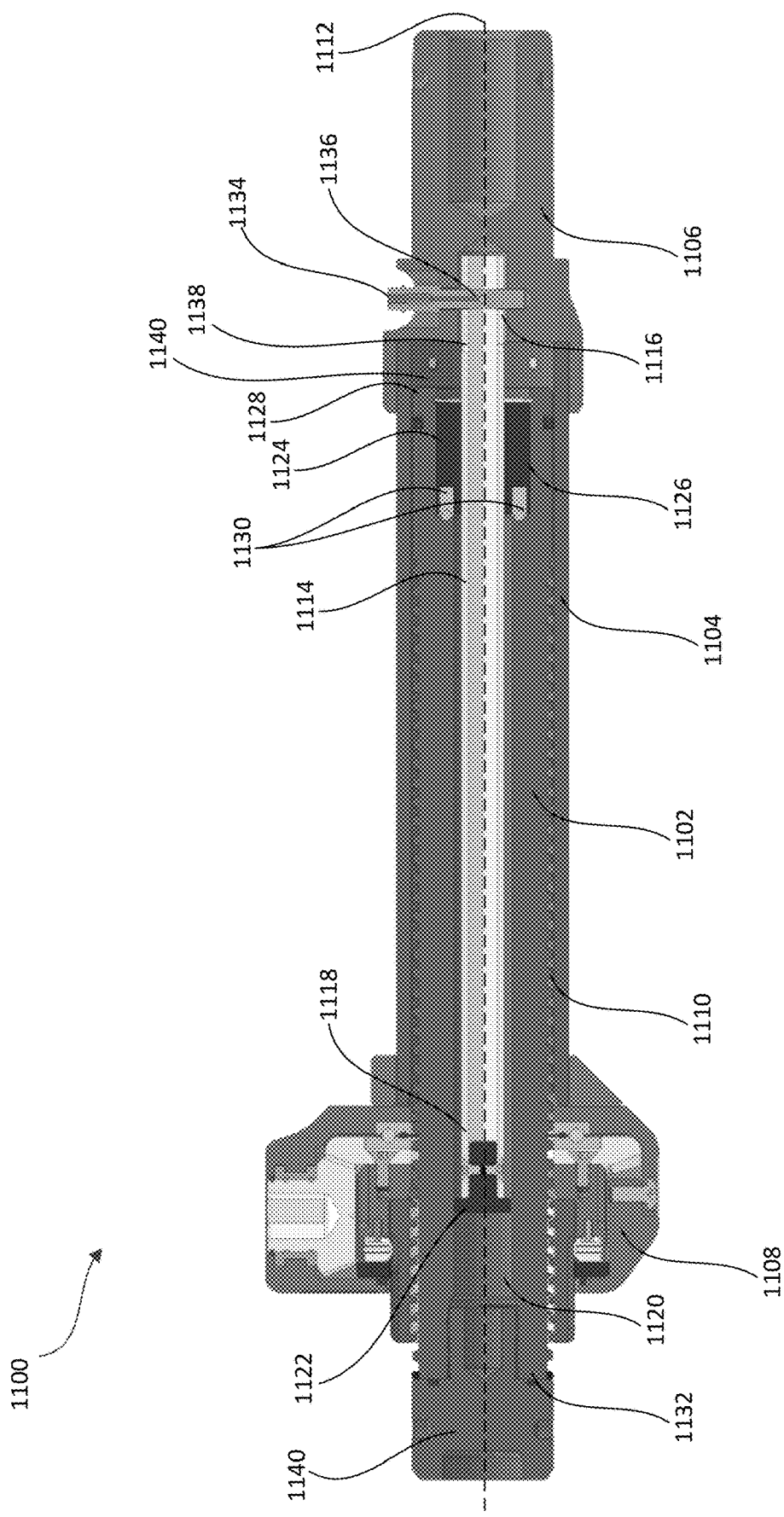
FIG. 11 schematically depicts a cross-sectional view of another implementation of a strut extender mechanism, according to one or more aspects described herein.

FIG. 11 schematically depicts a cross-sectional view of another implementation of a strut extender mechanism 1100, according to one or more aspects described herein. In one example, the strut extender mechanism 1100 may include an extendable member 1102 that is configured to move relative to outer housing 1104. The outer housing 1104 may be rigidly coupled to lock structure 1106 and to extending mechanism 1108. In one implementation, the extendable member 1102 may be similar to extendable member 104, outer housing 1104 may be similar to outer housing 102, and extending mechanism 1108 may be similar to extending mechanism 700. The extendable member 1102 includes thread structure 1110 that may interface with the extending mechanism 1108. The extending mechanism 1108 may be configured to drive the extendable member 1102 in a linear direction along a longitudinal length/central axis 1112.

In one example, when extending from or retracting into the outer housing 1104, the extendable member 1102 may be configured to translate without rotation about central axis 1112. Rotation of the extendable member 1102 as it is being urged in a linear direction by the extending mechanism 1108 may be prevented by a hexagonal rod 1114. In the specific implementation of FIG. 11, rod 1114 may have a hexagonal outer cross-section, but it is contemplated that rod 1114 may be implemented with other non-circular cross-sections, without departing from the scope of these disclosures. For example, rod 1114 may have a triangular cross-section, a square cross-section, or an octagonal cross-section, among others. The rod 1114 may be rigidly coupled to the lock structure 1106 and outer housing 1104. In one example, a first end 1116 of the rod 1114 may be rigidly coupled to the lock structure 1106 and a second end 1118 may be configured to slide within the cylindrical bore 1120 of the of the extendable member 1102. The rod 1114 may be sized such that it does not contact the sidewalls of the bore 1120. End cap 1122 may be coupled to the second end 1118 of the rod 1114. The end cap 1122 may have a circular outer surface that extends further than the rod 1114 in a direction perpendicular to the central axis 1112. The circular outer surface of the end cap 1122 may be configured to side along the sidewall surface of the cylindrical bore 1120. As such, the circular outer surface of the end cap 1122 may be formed from a metal, an alloy, a ceramic, a fiber-reinforced material, or a polymer, among others. In one example, the circular outer surface of the end cap 1122 may include a material a lower coefficient of friction than the sidewall surface of the cylindrical bore 1120. Additionally or alternatively, a lubricant may be used to reduce friction between the circular outer surface of the end cap 1122 and the sidewall surface of the cylindrical bore 1120.

The hexagonal rod 1114 may be received into a hexagonal bushing 1124. Further, the hexagonal bushing 1124 may be received into a cylindrical cavity 1126 at a first end 1128 of the extendable member 1102. In one example. The hexagonal bushing 1124 may be prevented from moving relative to the extendable member 1102 in a direction parallel to the central axis 1112. However, in one implementation, the hexagonal bushing 1124 may have a cylindrical outer surface, and may be configured to be rotatable within the cylindrical cavity 1126. In one example, the hexagonal bushing 1124 may include one or more ball plungers 1130 that may exert a spring force against the end wall of the cylindrical cavity 1126. This spring force may prevent the hexagonal bushing 1124 from rotating within the cylindrical cavity 1126 when the extendable member 1102 is being driven by the extending mechanism 1108, thereby preventing rotation of the extendable member 1102 about central axis 1112 and relative to the extending mechanism 1108, outer housing 1104 and lock structure 1106. Advantageously, this functionality may prevent rotation of the extendable member 1102 about central axis 1112 when the extendable member 1102 is being linearly translated along central axis 1112. In turn, this functionality may further prevent a structure that is attached to a second end 1132 of the extendable member 1102 from rotating, and thereby prevent potential misalignment of that attached structure relative to an external structure that is to be braced with the extender mechanism 1100. For example, a non-circular plate (not depicted) may be attached to the second end 1132, and that plate may be intended to make contact with an external surface when positioned in a specific orientation. Accordingly, a user may orient said plate and actuate the extending mechanism 1108 to move the extendable member 1102 into contact with an external surface, without rotating the attached plate. As depicted in the FIG. 11, the second end 1132 of the extender member 1102 is removably coupled to an end cap 1140. However, additional or alternative elements may be coupled to the extender member 1102, without departing from the scope of these disclosures.

Further advantageously, the ball plungers 1130 of the hexagonal bushing 1124 may allow the extendable member 1102 to rotate about axis 1112, if desired. For example, the ball plungers may be compressed and the hexagonal bushing 1124 may rotate within the cylindrical cavity 1126 upon application of a manual rotational force to the extendable member 1102. For example, the extendable member 1102 may be manually screwed into or out of the extending mechanism 1108 by rotating the second end 1132 about the central axis 1112.

In one implementation, the extendable member 1102 may be prevented from being fully removed from the outer housing 1104. When fully-extended, the hexagonal bushing 1124 of the extendable member 1102 may be configured to abut the end cap 1122 to prevent the extendable member 1102 from being fully removed from the outer housing 1104.

In one implementation, the extendable member 1102 may be pneumatically actuated. In one example, compressed air may be introduced through inlet 1134. The compressed air may enter an internal cavity of the rod 1114 through outlet 1136, and enter a cavity 1140 of the bore of the outer housing 1104 through outlet 1138. The compressed air may fill the cavity 1140 and urge the extendable member 1102 to move along the central axis 1112.

In certain examples, the strut system rated for lift and shoring. In some examples, the lifting a shoring capabilities are sufficient to lift and subsequently brace an automobile. For example, the system may be capable of lifting five thousand pounds or more, ten thousand pounds or more, twenty thousand pounds or more, thirty-five thousand pounds or more, or fifty thousand pounds or more. As another illustrative example, in certain embodiments, the system is capable of lifting at least six thousand pounds or more even factoring in a four-to-one safety factor (i.e., a total capability of twenty-four thousand pounds or more).

The strut may also be capable of supporting large weights. For example, the system may be capable of bracing/shoring ten thousand pounds or more, twenty-five thousand pounds or more, fifty thousand pounds or more, sixty-five thousand pounds or more, or eighty thousand pounds or more. Thus, the strut system may be capable of shoring a wide variety of materiel and objects, and when desired, can additionally lift significant weights when this is desired or necessary in the field. Users may also use the extending device to facilitate extension for shoring purposes rather than expressly lifting.

In certain examples, the extending mechanisms 106 and 506 may be configured to be operated from a remote location. In one example, the extending mechanism may be driven by a mechanical or manual rotational force from a distance of 6 feet or more, or 10 feet or more. This remote actuation may be accomplished by using an extended shaft (not depicted) that is manually rotated and configured to engage and rotate the shaft 308 and/or shaft 612. Additionally or alternatively, the extending mechanisms 106 and 506 may be operated from a remote location by remotely controlling one or more mechanical drive elements (e.g. electrical, hydraulic, or pneumatic motors, among others) that are configured to engage and rotate the shaft 308 and/or shaft 612. This separation distance between a human operator and the extending mechanisms 106 and 506 may allow the operator to lift an object (such as an automobile) from a relatively safe distance in case the lifting shifts the automobile in an undesired or unanticipated manner. A user may also use the system to more strongly shore an object from a distance by using the extending mechanism to extend the strut as needed to more fully shore an object, without the express goal of lifting the object. In some examples, one or more connecting cables span a distance from an operating device (such as but not limited to a remote or an air pressure controller) and are configured to transmit one or more signals to active the extending device (e.g., cause rotational motion or other motion) when desired.

In some examples, an adjustable strut includes an outer housing including a first end, a second end, and a first bore with a first longitudinal length, an extendable member including a first end, a second end, a second longitudinal length, and a thread structure along at least a portion of the second longitudinal length. In certain embodiments, the first end of the extendable member is received into the first bore through the first end of the outer housing, and the extendable member is slidable along the first longitudinal length between a fully-extended position and a contracted position. In some examples, the strut includes an extending mechanism including a first end, a second end, a second bore with a third longitudinal length, a gear system, and an input mechanism connected to the gear system. In various embodiments, the first end of the extending mechanism is connected to the first end of the outer housing and the extendable member is slidable along the third longitudinal length. In some examples, the input mechanism initiates the gear system, which interacts with the threaded structure of the extendable member, causing the extendable member to move along the first longitudinal length between a fully-extended position and a contracted position.

In various embodiments, an extending mechanism for an adjustable strut includes a lower housing that includes a first end configured to be connected to an outer housing of an adjustable strut, a second end, and a first bore configured to receive an extendable member of an adjustable strut such that the extendable strut is slidable along a first longitudinal length of the first bore. In certain examples, the strut includes an upper housing including a first end configured to be connected to the second end of the lower housing, a second end, and a second bore configured to receive the extendable member of an adjustable strut such that the extendable strut is slidable along a second longitudinal length of the second bore. In various embodiments, the strut includes a threaded collar contained at least partially in the upper housing and including a first end, a second end, and a threaded bore configured to interact with an extendable member of an adjustable strut with a threaded structure along at least a portion of the extendable member. In some examples, the strut includes a gear system contained at least partially in the lower housing, the gear system including a first bevel gear configured to interact with a second bevel gear, where the second bevel gear includes a bore and is attached to the first end of the threaded collar. In various examples, the strut includes an input mechanism connected to the first bevel gear, where rotating the input mechanism causes the first bevel gear to rotate, which interacts with the second bevel gear and causes the second bevel gear to rotate, which in turn causes the threaded collar to rotate, which in turn causes the threaded bore to interact with the threaded structure of the extendable member, causing the extendable member to move along the first longitudinal length of the first bore and second longitudinal length of the second bore.

In certain embodiments, an extending mechanism for an adjustable strut includes a housing including a first end, a second end, and a bore with a longitudinal length, where the first end is connected to an outer housing of an adjustable strut and the bore is configured to receive a threaded extendable member of the adjustable strut so that the threaded extendable member is slidable along the longitudinal length of the bore. In certain examples, the extending mechanism includes a gear system within the housing, the gear system including a first bevel gear configured to interact with a second bevel gear, where the second bevel gear connected to a worm, and the worm is configured to further interact with at least one worm gear. In some examples, the at least one worm gear is connected to at least one drive gear, where the drive gear is further configured to interact with the threaded structure of the extendable member. In various embodiments, the extending mechanism includes an input mechanism, where rotating the input mechanism causes the first bevel gear to rotate, which interacts with the second bevel gear and causes the second bevel gear to rotate, which causes the worm to rotate, which interacts with the worm gear and causes the at least one worm gear to rotate, which causes the at least one drive gear to rotate, which interacts with the threaded structure of the extendable member, causing the extendable member to move along the longitudinal length of the bore.

In one aspect, an adjustable strut may include an outer housing that has a first end spaced apart from a second end along a first central axis. The outer housing may also have a first bore that extends between the first end and the second end. The adjustable strut may also include an extendable member that has a first end spaced apart from a second end along a second central axis. The extendable member may have a threaded structure along at least a portion of a longitudinal length of the extendable member. The first end of the extendable member may be received into the first bore of the outer housing through the first end of the outer housing. Also, the extendable member may be movable within the first bore between a fully-extended position and a contracted position. The adjustable strut may additionally include an extending mechanism that has a first end spaced apart from a second end along a third central axis. The second end of the extending mechanism may be removably coupled to the first end of the outer housing, and the first central axis, the second central axis, the third central axis may be substantially parallel to one another. The extending mechanism may have a second bore that extends along the third central axis, and may be configured to receive the extendable member. Additionally, the extending mechanism may include an input mechanism configured to be actuated to linearly translate the extendable member relative to the outer housing and the extending mechanism. The input mechanism may further include an input shaft configured to rotate about a rotational axis substantially perpendicular to the third central axis. The input mechanism may also include a gear system that is configured to rotatably connect the input shaft to the extendable member such that rotation of the input shaft about the rotational axis is converted into linear translation of the extendable member along the third axis.

In one embodiment, the rotational axis is a first rotational axis, and the gear system further includes a first bevel gear that is coupled to the input shaft and configured to rotate about the first rotational axis. The gear system may also include a second bevel gear that is configured to mate with and rotate in response to rotational motion of the first bevel gear. The second bevel gear may rotate about a second rotational axis that is substantially perpendicular to the first rotational axis. The gear system may additionally include a threaded collar that is coupled to the second bevel gear and configured to rotate about the second axis of rotation. The threaded collar may be configured to mate with the thread structure of the extendable member, and rotation of the threaded collar may urge the extendable member to rotate about an linearly translate along the third central axis.

In another embodiment, the rotational axis is a first rotational axis, and the gear system further includes a first bevel gear that is coupled to the input shaft and configured to rotate about the first rotational axis. The gear system may also include a second bevel gear that is configured to make with an rotation response to rotational motion of the first bevel gear. The second bevel gear may rotate about a second rotational axis that is substantially perpendicular to the first rotational axis. The gear system may additionally include a worm that is rigidly coupled to the second bevel gear and configured to rotate about the second rotational axis. The gear system may also include a worm gear that is configured to mate with an rotation response to rotational motion of the worm, wherein the worm gear may rotate about a third rotational axis that is substantially parallel to the first rotational axis. The gear system may also include a drive gear that is rigidly coupled to the worm gear and configured to rotate about the third rotational axis. The drive gear may be configured to mate with the thread structure of the extendable member such that rotation of the drive gear may urge the extendable member to rotate about an linearly translate along the third central axis.

In another embodiment, the drive gear is a conical gear.

In another embodiment, the adjustable strut may include a directional lock, and the directional lock may include a spring-loaded pawl that engages with a gear of the gear system to allow the gear system and extendable member to move in one direction only.

In another embodiment, the directional lock may be adjustable between a first configuration and a second configuration. When positioned in the first configuration, the input shaft may be rotatable in a first direction only, and when positioned in the second configuration, the input shaft may be rotatable in a second direction only.

The second end of the outer housing may be configured to be removably coupled to a lock structure, and the lock structure may be configured to be removably coupled to a base element. The base element may further be configured to abut an external surface against which the adjustable strut is braced.

The input shaft may be configured to be actuated by a manual crank handle or a motor.

In one embodiment, the first bevel gear may be mated with the second bevel gear, with the first bevel gear positioned closer to the first end of the extending mechanism than the second bevel gear.

In another embodiment, the first bevel gear may be mated with the second bevel gear, and the first bevel gear may be positioned closer to the second end of the extending mechanism than the second bevel gear.

The threaded collar may be constructed from a polymeric material, and the thread structure of the extendable member may be constructed from a metallic material.

The first central axis, the second central axis, and the third central axis may be co-linear.

In another aspect, an extending mechanism may include an upper housing coupled to a lower housing and having a first end spaced apart from a second end along a central axis. The extending mechanism may have a bore that extends along a central axis, and may be configured to receive an extendable member. Additionally, the extending mechanism may include an input mechanism configured to be actuated to linearly translate the extendable member relative to the outer housing and the extending mechanism. The input mechanism may further include an input shaft configured to rotate about a rotational axis substantially perpendicular to the central axis. The input mechanism may also include a gear system that is configured to rotatably connect the input shaft to the extendable member such that rotation of the input shaft about the rotational axis is converted into linear translation of the extendable member along the central axis.

Aspects of the disclosure have been described in terms of illustrative embodiments thereof. Numerous other embodiments, modifications, and variations within the scope and spirit of disclosure will occur those of ordinary skill in the art. For example, instead of threads, one or more lifting gears may be configured to interact with horizontal steps or notches along the length of the adjustable member, or any other features that allow engagement and traversal of the extendable member by sequential interaction of a lifting component. In this illustrative example, vertical rotation of a lifting gear (e.g., directly or indirectly derived from vertical, horizontal, and/or rotation motion provided by a user) may be used to lift/lower the extendable member. Additionally, those of ordinary skill in the art will recognize that the elements depicted in the accompanying figures are for schematic illustration purposes only, and that the relative sizes of the depicted elements may vary, without departing from the scope of the disclosures described herein. Further, those of ordinary skill in the art will recognize that the various elements described in this disclosure may be modified (e.g., scaled and/or have lengths and/or thicknesses of one or more structural elements adjusted) without departing from the scope of the disclosures described herein.

We claim:
1. An adjustable strut, comprising:
an outer housing including a first end spaced apart from a second end along a first central axis, and a first bore extending between the first end and the second end;
an extendable member including a first end spaced apart from a second end along a second central axis, and having a thread structure along at least a portion of a longitudinal length of the extendable member, wherein the first end of the extendable member is received into the first bore through the first end of the outer housing, and wherein the extendable member is movable within the first bore between a fully-extended position and a contracted position;
an extending mechanism, comprising:
a first end spaced apart from a second end along a third central axis, wherein the second end of the extending mechanism is removably coupled to the first end of the outer housing, wherein the first central axis, the second central axis, and the third central axis are substantially parallel to one another;
a second bore extending along the third central axis, and configured to receive the extendable member;
an input mechanism configured to be actuated to linearly translate the extendable member relative to the outer housing and the extending mechanism, the input mechanism further comprising:
an input shaft configured to rotate about a rotational axis substantially perpendicular to the third central axis, wherein the input shaft is configured to be actuated by a manual crank handle; and
a gear system, configured to rotatably connect the input shaft to the extendable member, such that rotation of the input shaft about the rotational axis is converted into linear translation of the extendable member along the third central axis.

2. The adjustable strut of claim 1, wherein the rotational axis is a first rotational axis, and the gear system further comprises:
a first bevel gear coupled to the input shaft and configured to rotate about the first rotational axis;
a second bevel gear, configured to mate with and rotate in response to rotational motion of the first bevel gear, wherein the second bevel gear rotates about a second rotational axis substantially perpendicular to the first rotational axis; and
a threaded collar coupled to the second bevel gear and configured to rotate about the second rotational axis, wherein the threaded collar is configured to mate with the thread structure of the extendable member, and wherein rotation of the threaded collar urges the extendable member to rotate about and linearly translate along the third central axis.

3. The adjustable strut of claim 1, wherein the rotational axis is a first rotational axis, and the gear system further comprises:
a first bevel gear coupled to the input shaft and configured to rotate about the first rotational axis;
a second bevel gear, configured to mate with and rotate in response to rotational motion of the first bevel gear, wherein the second bevel gear rotates about a second rotational axis substantially perpendicular to the first rotational axis;
a worm, rigidly coupled to the second bevel gear and configured to rotate about the second rotational axis;
a worm gear, configured to mate with and rotate in response to rotational motion of the worm, wherein the worm gear rotates about a third rotational axis substantially parallel to the first rotational axis; and
a drive gear, rigidly coupled to the worm gear and configured to rotate about the third rotational axis, wherein the drive gear is configured to mate with the thread structure of the extendable member, and wherein rotation of the drive gear urges the extendable member to rotate about and linearly translate along the third central axis.

4. The adjustable strut of claim 3, wherein the drive gear is a conical gear.

5. The adjustable strut of claim 1, further comprising a directional lock, wherein the directional lock further comprises:
a spring-loaded pawl that engages with a gear of the gear system to allow the gear system and the extendable member to move in one direction only.

6. The adjustable strut of claim 5, wherein the directional lock is adjustable between a first configuration and a second configuration, wherein when positioned in the first configuration, the input shaft is rotatable in a first direction only, and wherein when positioned in the second configuration, the input shaft is rotatable in a second direction only.

7. The adjustable strut of claim 1, wherein the second end of the outer housing is configured to be coupled to a lock structure, and the lock structure is configured to be removably coupled to a base element, and wherein the base element is configured to abut an external surface against which the adjustable strut is braced.

8. The adjustable strut of claim 2, wherein the first bevel gear is mated with the second bevel gear, with the first bevel gear positioned closer to the first end of the extending mechanism than the second bevel gear.

9. The adjustable strut of claim 2, wherein the first bevel gear is mated with the second bevel gear, with the first bevel gear positioned closer to the second end of the extending mechanism than the second bevel gear.

10. The adjustable strut of claim 2, wherein the threaded collar comprises a polymeric material and the thread structure of the extendable member comprises a metallic material.

11. The adjustable strut of claim 1, wherein the first central axis, the second central axis, and the third central axis are co-linear.

12. An extending mechanism for an adjustable strut, comprising:
a housing, and having a first end spaced apart from a second end along a central axis;
a bore extending along the central axis, and configured to receive an extendable member;
an input mechanism configured to be actuated to linearly translate the extendable member relative to the extending mechanism, the input mechanism further comprising:
an input shaft configured to rotate about a rotational axis substantially perpendicular to the central axis;
a gear system, configured to rotatably connect the input shaft to the extendable member, such that rotation of the input shaft about the rotational axis is converted into linear translation of the extendable member along the central axis-; and
a directional lock, wherein the directional lock further comprises a spring-loaded pawl that engages with a gear of the gear system to allow the gear system and the extendable member to move in one direction only.

13. The extending mechanism of claim 12, wherein the rotational axis is a first rotational axis, and the gear system further comprises:
a first bevel gear coupled to the input shaft and configured to rotate about the first rotational axis;
a second bevel gear, configured to mate with and rotate in response to rotational motion of the first bevel gear, wherein the second bevel gear rotates about a second rotational axis substantially perpendicular to the first rotational axis; and a threaded collar rigidly coupled to the second bevel gear and configured to rotate about the second rotational axis, wherein the threaded collar is configured to mate with a thread structure of the extendable member, and wherein rotation of the threaded collar urges the extendable member to rotate about and linearly translate along the central axis.

14. The extending mechanism of claim 12, wherein the rotational axis is a first rotational axis, and the gear system further comprises:
    a first bevel gear coupled to the input shaft and configured to rotate about the first rotational axis;
    a second bevel gear, configured to mate with and rotate in response to rotational motion of the first bevel gear, wherein the second bevel gear rotates about a second rotational axis substantially perpendicular to the first rotational axis;
    a worm, rigidly coupled to the second bevel gear and configured to rotate about the second rotational axis;
    a worm gear, configured to mate with and rotate in response to rotational motion of the worm, wherein the worm gear rotates about a third rotational axis substantially parallel to the first rotational axis; and
    a drive gear, rigidly coupled to the worm gear and configured to rotate about the third rotational axis, wherein the drive gear is configured to mate with a thread structure of the extendable member, and wherein rotation of the drive gear urges the extendable member to rotate about and linearly translate along the central axis.

15. The extending mechanism of claim 14, wherein the drive gear is a conical gear.

16. The extending mechanism of claim 12, wherein the directional lock is adjustable between a first configuration and a second configuration, wherein when positioned in the first configuration, the input shaft is rotatable in a first direction only, and wherein when positioned in the second configuration, the input shaft is rotatable in a second direction only.

17. An extending mechanism for an adjustable strut comprising:
    a lower housing comprising:
        a first end;
        a second end configured to be connected to an outer housing of the adjustable strut; and
        a first bore configured to receive an extendable member of the adjustable strut such that the extendable member is slidable along a first longitudinal length of the first bore;
    an upper housing comprising:
        a first end;
        a second end configured to be connected to the first end of the lower housing, and
        a second bore configured to receive the extendable member of the adjustable strut such that the extendable member is slidable along a second longitudinal length of the second bore;
    a threaded collar contained at least partially in the upper housing and having a first end, a second end, and a threaded bore configured to interact with the extendable member of the adjustable strut with a threaded structure along at least a portion of the extendable member;
    a gear system contained at least partially in the lower housing, comprising:
        a first bevel gear configured to interact with a second bevel gear; and
        the second bevel gear having a bore, wherein the second bevel gear is attached to the second end of the threaded collar; and
    an input mechanism connected to the first bevel gear, wherein rotating the input mechanism causes the first bevel gear to rotate, which interacts with the second bevel gear and causes the second bevel gear to rotate, which causes the threaded collar to rotate, which causes the threaded bore to interact with the threaded structure of the extendable member, causing the extendable member to move along the first longitudinal length of the first bore and second longitudinal length of the second bore.

* * * * *